Patented Oct. 16, 1934

1,976,806

UNITED STATES PATENT OFFICE 1,976,806

CONVERSION OF ORGANIC SULPHUR COMPOUNDS WITH FERROUS SULPHIDE

Raphael Rosen, Cranford, and Eugene Lieber, Elizabeth, N. J., assignors to Standard Oil Development Company, a corporation of Delaware No Drawing. Application September 18, 1931, Serial No. 563,670

9 Claims. (Cl. 23—3)

This invention relates to new and improved catalysts for the conversion of organic sulphur compounds to hydrogen sulphide and more especially to the desulphurization of normally gaseous petroleum products and other fuel gases with catalysts containing ferrous sulphide.

It is desirable in many catalytic processes to have the reactants purified of sulphur compounds to as great an extent as possible. For example, in the catalytic conversion of hydrocarbons with steam over activated nickel catalysts to form hydrogen and oxides of carbon, sulphur concentrations as low as 2 or 3 grains per 100 cubic feet are extremely undesirable and require catalyst temperatures at least 300 or 400° F. higher than are necessary for equal conversions with substantially sulphur free gases.

Many methods have been described for the desulphurization of reducing gases by passing them at suitably elevated temperatures over catalysts but we have found that such methods deal generally with much higher initial and final sulphur concentrations for preparing gases for domestic or industrial use as fuel and that the known processes are inadequate in reducing sulphur concentrations to below about 1 or 2 grains per 100 cubic feet. We have now found an improved catalyst whereby the sulphur concentration in gases may be reduced to as low as 0.2 to 0.05 grains per 100 cubic feet or even lower in a single pass and that such gases may then be considered substantially sulphur free even when used with highly active catalysts which are sensitive to sulphur poisoning. We have found that the sulphides of iron and especially ferrous sulphide are extremely active catalysts for the desulphurization of hydrocarbons. The iron sulphide may be used in a finely divided form distributed on iron turnings, activated charcoal, silica gel, or refractory supports which may be inert or may act as catalyst promotors, or it may be employed in a massive form as briquettes or pills of the amorphous sulphides and we have found that even the fused iron sulphide, commonly known in the industries and chemical laboratories, is a highly active catalyst. The oxides and sulphides of the metals of the third and sixth groups of the periodic table also show desirable catalytic activity when mixed with iron sulphide and may be considered as activators or promoters for the latter.

The following examples are illustrative of the activity of our catalyst.

*Example 1.*—A stabilizer vent gas produced in the rectification of absorption plant petroleum naphtha and containing from 4 to 20 grains and occasionally even 100 grains of organic sulphur per 100 cubic feet and no hydrogen was passed at a rate of about 500 volumes of gas per volume of catalyst per hour over a catalyst consisting of small lumps of commercial ferrous sulphide at a temperature of 350 to 400° C. The average organic sulphur content of the treated gas was between one-tenth and two-tenths grains per 100 cubic feet and the catalyst showed no indications of any loss in activity during the test of 320 hours.

*Example 2.*—A fixed gas produced on cracking a gas oil fraction of petroleum was scrubbed with oil to remove substantially all the butanes and heavier hydrocarbons and was then scrubbed with an aqueous solution of sodium carbonate and finally with caustic soda to remove substantially all of the hydrogen sulphide. This gas then contained from 2 to 10 grains of organic sulphur per 100 cubic feet and from 10 to 15% of hydrogen. It was treated under the same conditions shown in Example 1 and also contained from one-tenth to two-tenths grains of organic sulphur per 100 cubic feet after this treatment. This run was continued for 1,500 hours with no indications of loss of catalyst activity.

Our catalysts are also effective in removing organically combined sulphur from water gas, coal gas, and other industrial fuel gases, and from the gases produced in the decomposition, as by cracking, hydrogenation or destructive hydrogenation, at atmospheric or elevated pressures, of carbonaceous materials including petroleum oils.

The concentration of organic sulphur compounds are so low in industrial fuel gases and in gases produced by cracking petroleum oils that the separation or identification of individual sulphur compounds is exceedingly difficult. We have not attempted to determine the exact nature of the organic sulphur compounds removed by our catalysts, and our invention is not dependent upon the composition of these compounds, since our catalyst is suitable for the desulphurization of all industrial fuel gases. However, we have prepared mixtures with desulphurized gases of such pure compounds as alkyl thio-ethers, disulphides and thiophene, in concentration up to 100 grains per 100 cubic feet of gas, and we have found our catalyst equally effective in removing all these sulphur compounds.

Our catalysts may be used at temperatures between about 400 and 1100° F. or higher, and they are preferably used at a temperature of about 700 to 900° F. It is preferable to use a temperature below that at which thermal decomposition of any hydrocarbons in the gases treated becomes appreciable, but such temperatures may be exceeded by making the time of contact with the catalyst so short that polymerization and coking on the catalyst is prevented, as will be understood.

Hydrogen sulphide was found in each of the gases treated with our catalysts. This hydrogen sulphide may be removed by any of the well known processes such as absorption with lime, soda lime, ordinary iron oxide as used in industrial gas plant practice, pyrolusite or other suitable absorbents, or the gases may be cooled and scrubbed with sodium carbonate or caustic soda or other suitable solutions. When the purified gases are to be used immediately for high temperature reactions it is, of course, preferable to remove the hydrogen sulphide without cooling and we have found that the commercial "Lux Mass" or "Alpha Lux", containing iron oxide in admixture with small amounts of such oxides as alumina, silica, titanium oxide, calcium oxide, magnesia and sodium oxide shows a very high capacity and removes the hydrogen sulphide substantially completely (to below at least 0.01 grain per 100 cubic feet). These purifying agents may be revivified by passing oxygen, preferably in low concentration, over them at the same temperatures used in operation. Soda lime and pyrolusite also are very effective agents for substantially completely removing the hydrogen sulphide.

It is not necessary with our catalysts to remove free hydrogen sulphide from the gases prior to the conversion of the organic sulphur, but the catalysts show increased activity with hydrogen sulphide-free gases. It is generally preferable to remove hydrogen sulphide, especially when the residual hydrogen sulphide is to be removed from the gases without reduction in temperature after the organic sulphur conversion step.

While our catalyst operates entirely satisfactorily without the addition of either hydrogen or steam to the hydrocarbons to be desulphurized we have found that neither hydrocarbon nor steam have an adverse effect and that either may be added, even greatly in excess of the organic sulphur compounds present, without impairing the efficiency of the catalyst.

Our invention is not to be limited to any theory of the operation of our process nor to any examples which have been given merely for purposes of illustration but only by the following claims in which we wish to claim all novelty as far as the prior art permits.

We claim:

1. A process for the desulphurization of normally gaseous hydrocarbons containing organic sulphur comprising passing the hydrocarbons at a reaction temperature below that causing appreciable cracking over a ferrous sulphide catalyst.

2. A process for the desulphurization of normally gaseous hydrocarbon mixtures containing organic sulphur compounds which comprises passing the hydrocarbon at a temperature between 400 and 1100° F. over a ferrous sulphide catalyst and removing hydrogen sulphide from the product.

3. A process for the desulphurization of gases produced in decomposing petroleum oils comprising the steps of first removing free hydrogen sulphide, second passing the gas over a ferrous sulphide catalyst at a temperature of about 700 to 900° F. then removing hydrogen sulphide from the gaseous product with a suitable absorbent without reduction in temperature.

4. A process for the desulphurization of fuel gases containing organic sulphur compounds comprising passing the gases at a reaction temperature below that causing appreciable thermal decomposition over a ferrous sulphide catalyst and then passing them over a metallic or oxide mass capable of absorbing hydrogen sulphide, without reduction in temperature.

5. A process for the conversion of organic sulphur compounds to hydrogen sulphide, which comprises contacting said organic sulphur compounds with a ferrous sulphide catalyst at a reaction temperature.

6. Process according to claim 5, in which the catalyst contains a promoter selected from the group comprising the oxides and sulphides of the metals of groups 3 and 6 of the periodic table.

7. Process according to claim 5, carried out in the absence of hydrogen.

8. Process according to claim 1 in which the ferrous sulphide catalyst is commercially prepared fused ferrous sulphide.

9. Process according to claim 1 in which the catalyst contains a promoter selected from the group consisting of the oxides and sulphides of the metals of groups 3 and 6.

RAPHAEL ROSEN.
EUGENE LIEBER.